Patented Sept. 23, 1952

2,611,715

UNITED STATES PATENT OFFICE 2,611,715

METHOD AND PRODUCTS UTILIZING CASHEW NUT SHELL LIQUID

Leon B. Palmer, Kearny, and Ralph W. Charlton, Verona, N. J., assignors to Congoleum-Nairn Inc., a corporation of New York No Drawing. Application June 25, 1948, Serial No. 35,278

14 Claims. (Cl. 106—252)

This invention relates to the preparation of products utilizing cashew nut shell liquid, and relates especially to the preparation of such products utilizing cashew nut shell liquid in combination with a modifying additive whereby thickening of the cashew nut shell liquid is promoted.

It is an object of this invention to provide an improved process for the preparation of thickened oleaginous material utilizing cashew nut shell liquid, and by such preparation to afford products and compositions having advantageous and valuable properties. It is a further object of this invention to facilitate and accelerate the production of thickened oleaginous material utilizing cashew nut shell liquid. It is a further object of this invention to afford such improvements utilizing an inexpensive and non-toxic modifying agent for the cashew nut shell liquid. It is a special object of this invention to improve the utilization of cashew nut shell liquid in the preparation of a binder for use in combination with filler materials so as to afford compositions having properties and characteristics which are of particular utility and advantage in providing the surfacing material for coverings for floors, walls, articles of furniture and the like, and which likewise are of general utility and advantage in the manufacture of other products.

According to the principal feature of this invention, the thickening of cashew nut shell liquid is greatly accelerated and promoted by commingling the cashew nut shell liquid with a previously oxidized siccative oil to form an admixture wherein the cashew nut shell liquid contains the oxidized siccative oil either dissolved or dispersed therein. When the cashew nut shell liquid and the previously oxidized siccative oil are thus commingled, there is a very pronounced effect resulting from the interaction of these materials whereby the capacity of the mixture to become thickened is greatly improved. Thus the thickening of these materials can be accomplished even under conditions which do not result in any appreciable thickening either of the cashew nut shell liquid alone or of the siccative oil alone; and when the conditions are such that the separate materials can be caused to become thickened, the thickening can be accomplished in much less time when the cashew nut shell liquid has been commingled with the previously oxidized siccative oil in the practice of this invention.

Raw cashew nut shell liquid is recovered from the cellular spaces between the double walled shell which grows around the kernel of the cashew nut, a member of the Anacardium family. The raw liquid is a low viscosity dark brown substance; and the raw liquid as solvent extracted from the shells generally is considered to consist of about 90% of anacardic acid ($C_{22}H_{32}O_3$) and about 10% of cardol ($C_{32}H_{52}O_4$). These compounds contain an unsaturated side chain. The raw liquid exhibits an unusually high iodine value (above 250) and produces a virulent action on the skin. In order to afford the raw cashew nut shell liquid in a more acceptable form, it is usually subjected to treatment whereby the quantity of vesicant that is present, as well as the quantity of certain naturally occurring mineral contaminants, are reduced. This treatment generally consists in processing the raw cashew nut shell liquid under heat and with partial polymerization in the presence of a small quantity of an acid such as sulphuric, hydrochloric, phosphoric or acetic. Hydrocarbon derivatives of such acids such as diethyl sulphate or other alkyl esters of sulphuric acid, or tributyl phosphate or other alkyl esters of phosphoric acid, also have been employed. Salts of mineral acids which on hydrolysis have an acid reaction have also been used, e. g., zinc chloride, stannic chloride, stannous chloride, phosphorus oxychloride and aluminum chloride.

If the cashew nut shell liquid, either in the raw condition or after processing of the character aforesaid, is subjected to heat treatment, such treatment results in some decarboxylation whereby the carboxyl group of anacardic acid is removed while the phenolic hydroxyl remains and closely related polymerizable phenolic compounds containing an unsaturated side chain are produced. Distillation under reduced pressure increases the yield of the decarboxylated cashew nut shell liquid.

The raw or treated cashew nut shell liquids above referred to are polymerizable under heat both per se and in the presence of polymerization catalysts. In the case of cashew nut shell liquid that has been treated with mineral acid and any of the other treating materials above mentioned, such treating material to a certain extent serves as a polymerization catalyst. Heat treatment in the presence of alkali also results in polymerization. In such case the amount of polymerization can be controlled by the discontinuance of those conditions which induce the polymerization, and cashew nut shell liquid is commonly placed on the market at various viscosities depending upon the amount of polymerization that has been caused to occur therein. The polymerization should not, however, be carried to a point where no further reaction can occur.

The raw or processed cashew nut shell liquid is reactive with aldehydes under mild heat to afford products of polymerization and condensation. Aldehydes such as formaldehyde, acetaldehyde, furfuraldehyde, and benzaldehyde, as well as hexamethylene tetramine, have been used. The degree of polymerization and condensation depends on the amount of aldehyde employed and the duration of the conditions that induce continuance of the polymerization and condensation reactions. Cashew nut shell liquid which has been subjected to polymerization and condensation reaction in admixture with an aldehyde is also available in liquid form and in different viscosities.

In the practice of this invention any of the processed or treated cashew nut shell liquids, as well as the raw cashew nut shell liquid, may be employed. The liquid may be readily flowable or of heavy syrupy consistency depending upon the state of partial polymerization. Likewise the cashew nut shell liquid may be treated to reduce the quantity of vesicant contained in the raw liquid and to remove certain of the naturally occurring minerals contained in the raw liquid in accordance with the common practice in the art. More generally, either raw cashew nut shell liquid or treated cashew nut shell liquid which still retains its liquid form and is capable of further polymerization induced by heat may be employed according to this invention and is referred to herein and in the claims as "cashew nut shell liquid."

Raw cashew nut shell liquid possesses little or no drying properties and therefore is unsuitable for use in paints and varnishes. However, when the cashew nut shell liquid has been subjected to heating either by itself or in the presence of some additive such as a mineral acid, an aldehyde or the like, the raw oil is modified so that it exhibits drying properties. Cashew nut shell liquid which has thus been modified so as to improve its drying properties heretofore has been proposed for use in the preparation of paints, varnishes, impregnants, etc., either as the sole binder or in combination with drying oils, resins, or the like.

Cashew nut shell liquid in any of its forms as hereinabove described is capable of polymerization under the influence of heat until there is ultimately produced a rubbery product that can be used as a binder for plastic filler-containing compositions. However, the time required for effecting such polymerization is undesirably great. For example, when treated cashew nut shell liquid is cooked at a temperature of about 245° F., about 32½ hours is required to convert the cashew nut shell liquid to a firmly gelled condition.

According to this invention, the production of thickened oleaginous compositions is greatly accelerated as the result of commingling cashew nut shell liquid with a siccative oil that previously has been subjected to oxidation. By way of specific illustration, when the treated cashew nut shell liquid, which required about 32½ hours of cooking to convert it to a firmly gelled condition, was commingled with a fluid partially oxidized linseed oil to afford a fluid mixture consisting of 90% of the treated cashew nut shell liquid and 10% of the partially oxidized linseed oil, and when the commingled materials were heated at the same temperature, namely, about 245° F., the time required to produce the same finely gelled consistency was only 1⅓ hours. When the same partially oxidized linseed oil by itself was subjected to cooking at the temperature mentioned, about 20½ hours were required to attain the same gelled consistency, and, in the case of raw linseed oil, the time required to obtain the same gelled consistency under similar conditions was very much greater. It is apparent, therefore, that the mixture becomes thickened much more rapidly than does either ingredient by itself. This is believed to be due to a specific interaction that takes place between the cashew nut shell liquid and the oxidized siccative oil. Whether this reaction is the result of catalytically promoted polymerization of either or both of the ingredients induced by the presence of the other, or is the result of chemical reaction between them is not at the present time understood. However, the fact that the interaction does occur has been definitely established and the reaction is one which takes place whenever the siccative oil has been subjected to substantial oxidation before the oxidized siccative oil is commingled with the cashew nut shell liquid.

The action which takes place according to this invention depends for its occurrence upon the previous substantial oxidation of the siccative oil prior to commingling the siccative oil with the cashew nut shell liquid, for the reaction does not take place when the siccative oil that is used has not been oxidized. By way of illustration, the same treated cashew nut shell liquid mentioned above was commingled with raw linseed oil to provide a mixture containing 10% and 90%, respectively, of the raw linseed oil and of the treated cashew nut shell liquid. Upon cooking this mixture at about 235° F., the time required to produce the firmly gelled condition above mentioned was no less than when the treated cashew nut shell liquid by itself was subjected to the same treatment. The same was true when the percentage of raw linseed oil was increased to 50%. Corresponding results were obtained when the raw linseed oil was replaced by raw soya bean oil, heat bodied linseed oil, or linseed oil fatty acids. The heat bodied linseed oil used in these tests was raw linseed oil that had been heated to 550° F. and held at this temperature until the oil had a viscosity at 77° F. of Z-3 as determined using Gardner-Holdt bubble viscometer tubes. The linseed oil fatty acids used had a minimum saponification value of 130, a minimum iodine value of 200 and a minimum acid value of 160.

Because of the fact that the reaction to produce a thickened oleaginous composition is greatly accelerated by the admixture of cashew nut shell liquid with a siccative oil that has previously been subjected to oxidation, one might expect that an analogous result could be obtained by mixing cashew nut shell liquid with an unoxidized siccative oil and then subjecting the mixture to oxidizing conditions, as by blowing the mixture at elevated temperatures. However, such is not the case. By way of illustration, the same treated cashew nut shell liquid was subjected to heat of the range 200° F. to 220° F. in the presence of an excess of air. For this purpose, a conventional Wood-Bedford type of oxidizer was used of the type conventionally used in the preparation of blown oils. In this type of oxidizer, the oil as disposed in the lower portion of a container is subjected to the action of partially immersed revolving blades which carry the oil in the form of a spray into the upper portion of the container through which a current of air is passed. Under such conditions, it required about 35 hours to convert the treated cashew nut shell liquid by itself to the consistency of a firm gel. When the same treated cashew nut shell liquid was mixed with raw linseed oil (one admixture contained 10% of the raw linseed oil and another contained 50% of the raw linseed oil), the time required to produce a thickened oil composition of similar consistency was no less and was actually greater in the case of the admixture containing 50% of the raw linseed oil. By contrast, when linseed oil was used which had previously been subjected to oxidation, the time required to attain the similar thickened consistency was greatly reduced. Thus, the same treated cashew nut shell liquid was mixed with previously oxidized linseed oil to form admixtures containing 10%, 50% and 90% of the oxidized linseed oil, respectively. When these mixtures were subjected to the same oxidizing treatment at the temperature of the order of 200° F. to 220° F. in the presence of excess air, the times required to produce the same gelled consistency were 1¼ hours in the case of the mixture containing 10% of the oxidized linseed oil, ⅓ hour in the case of the admixture containing 50% of the oxidized linseed oil, and 2½ hours in the case of the admixture containing 90% of the oxidized linseed oil.

It is apparent from the foregoing that the improved rate of thickening that is accomplished because of the reaction between cashew nut shell liquid and a previously oxidized siccative oil commingled therewith occurs both in the presence and in the absence of oxidizing conditions, and that in either case it is essential that the siccative oil be oxidized prior to its admixture with the cashew nut shell liquid. When the siccative oil is thus previously oxidized, the rate at which the reaction takes place is substantially the same whether or not oxidizing conditions are present, and because of this fact the thickening of the mixed materials is ordinarily accomplished without resort to blowing or other oxidizing conditions. For example, the reaction can conveniently be carried out by cooking in a Pfleiderer mixer.

The reaction between cashew nut shell liquid and a previously oxidized siccative oil is promoted by heating, but the reaction takes place even at ordinary atmospheric temperatures, although much more slowly. This may be illustrated in the following way. Two parts of treated cashew nut shell liquid were mixed with one part of toluol, and the solution was permitted to stand in a sealed container at atmospheric temperature, namely, about 70° F. to 75° F. After standing for 816 hours, no change in viscosity had occurred. Similar determinations were made with solvent thinned mixtures of the treated cashew nut shell liquid with raw linseed oil, with heat bodied linseed oil and with linseed oil fatty acids, respectively, for both 10% and 50% contents of added oil contained in the admixture of cashew nut shell liquid and added oil. In these determinations, no material change in viscosity occurred after standing for 816 hours. When, however, a mixture consisting of 450 parts of treated cashew nut shell liquid, 50 parts of oxidized oil and 225 parts of toluol was placed in a sealed container maintained at atmospheric temperature, the viscosity at atmospheric temperature increased from 2470 centipoises to 5750 centipoises after only 18 hours, to 9200 centipoises after 288 hours, and after 816 hours the mixture became converted to a soft gel. When the proportion of the oxidized linseed oil was increased, the reaction occurred still more rapidly at room temperature. Thus when a mixture containing 250 parts of treated cashew nut shell liquid, 250 parts of oxidized linseed oil and 125 parts of toluol was similarly tested, the viscosity at atmospheric temperature increased from 6000 centipoises to 20,000 centipoises after only 18 hours and had become converted to a gel. Upon further standing at room temperature, the stiffness of the gel continued to increase.

While the reaction between cashew nut shell liquid and an oxidized siccative oil occurs at ordinary atmospheric temperatures, the rate at which the reaction takes place increases as the temperature of the mixed oils is increased, and for practical commercial operation the reaction is carried out under the influence of heat. For usual commercial operations, temperatures above 175° F. are employed, e. g., temperatures of the order of 200° F. to 275° F. are preferred. While temperatures up to and above 300° F. can be employed, e. g., up to about 400° F., employment of temperatures above 300° F. tend to result in some darkening of the product. Under the influence of heat, the desired amount of thickening can be obtained very quickly, and when the desired amount of thickening has been obtained, further active thickening of the mixture can be discontinued by cooling the mixed materials to ordinary temperatures. However, further thickening or stiffening of the product can be accomplished by seasoning at moderate temperatures such as those commonly employed in the linoleum industry for seasoning linoleum floor coverings. During the thickening reaction the admixed materials are ordinarily subjected to mechanical working in order to preserve the mass in as homogeneous a condition as possible and in order to promote the rate of reaction.

The extent to which the siccative oil has been oxidized prior to its being commingled with the cashew nut shell liquid is subject to wide variation. In the various examples referred to hereinabove the oxidized oil employed was raw linseed oil which had been subjected without driers to controlled vigorous mechanical agitation in the presence of an excess of air at a temperature of the order of 220° F. to 240° F. until the amount of added oxygen was about 6% by weight. More specifically, the oil used was linseed oil which in the raw or untreated condition contained substantially 10.8% by weight of combined oxygen and which had been subjected to oxidation under the conditions stated until it contained substantially 17% by weight of combined oxygen, the oil in this condition being a fluid that was readily miscible with the cashew nut shell liquid. When reference is made herein and in the claims to "added oxygen," the reference is to the difference in amount of oxygen content expressed in percent by weight as between (1) the oxygen content of the original raw or unoxidized oil and (2) the oxygen content of the final oxidized oil. The amount of oxygen content referred to is in any case that determined by the classical carbon and hydrogen combustion analysis method. In general, the greater the amount of added oxygen which is contained in the previously oxidized siccative oil within those limits which are consistent with the oxidized oil occurring either in a fluid condition or in a soft gel condition that is substantially completely soluble with the cashew nut shell liquid, the greater will be the extent to which the thickening reaction will be accelerated according to this invention. However, the amount of added oxygen does not have to be as great as 6%, although slight amounts of added oxygen have only slight effect in accelerating the thickening reaction, and it is not until the amount of added oxygen reaches about 2% that the acceleration of the thickening reaction is promoted to a marked degree. Thus, when the amount of added oxygen is 2% by weight, the time for producing thickening to a gel consistency in the case of a mixture consisting of 10% of the oxidized siccative oil and 90% of cashew nut shell liquid maintained at a temperature of about 240° F. was cut roughly in half as compared with the time required to produce a corresponding gel consistency in the case of the cashew nut shell liquid by itself under like conditions. As the amount of added oxygen is increased so as to be in excess of 2% the time required in order to accomplish the thickening decreases rapidly until the amount of added oxygen is about 9%. Thus, when raw linseed oil is subjected to oxidation and polymerization at a temperature of the order of 160° F. to 220° F. in the presence of conventional driers while the oil is mechanically agitated, e. g., using a Wood-Bedford type of oxidizer, the oil is converted to a soft light-colored mass of gel-like consistency known in the art as "blown oil." This blown oil contains about 20% by weight oxygen which corresponds to about 9% by weight of added oxygen. Such blown oil is miscible with cashew nut shell liquid and when a mixture consisting of 10% of the blown oil and 90% of the cashew nut shell liquid was subjected to thickening under the above-mentioned conditions, corresponding gelation took place in only about ⅓ hour, namely, at a rate about 90 times greater than the rate of thickening of the cashew nut shell liquid by itself under like conditions. For preferred practice of this invention the amount of added oxygen contained in the previously oxidized siccative oil ranges from about 4% to about 9% by weight.

When the amount of oxygen added to the siccative oil is increased so that the added oxygen is in excess of about 9%, the accelerating action of oxygen content of the oxidized siccative oil becomes counterbalanced due to increased insolubility of the oxidized oil with the cashew nut shell liquid. However, complete or even substantial solubility of the previously oxidized siccative oil in the cashew nut shell liquid is not essential. Thus linseed oil was subjected to gradual oxidation and polymerization by exposure in thin films to the atmosphere according to the well-known "scrim" or Walton process (British Patent No. 209 of 1860) until the oil was converted to a firm gel of the kind commonly used in compounding linoleum cement, and the resulting skins were mixed with cashew nut shell liquid in the proportion of 10% of the skins to 90% of the cashew nut shell liquid. When the resulting mixture was heated to about 245° F. the skins did not appear to dissolve substantially in the cashew nut shell liquid but nevertheless the time required to produce corresponding gelatin was less than ⅓ that required for the cashew nut shell liquid by itself both in the case of freshly ground skins and skins which had been aged for two months. Siccative oils which contain less than 9% by weight of added oxygen and which are readily dissolved in the cashew nut shell liquid are preferably employed in the practice of this invention both because optimum conditions for rapid thickening reaction are achieved and because the product is more homogeneous, but those siccative oils which have been oxidized to such extent that they contain over 9% by weight of added oxygen and up to about 16.5% by weight of added oxygen may be utilized in the practice of this invention even though they may possess limited solubility in cashew nut shell liquid or such slight solubility as to be virtually insoluble.

The proportion of the previously oxidized siccative oil that is employed in conjunction with cashew nut shell liquid in the practice of this invention likewise may be widely varied. Maximum rate of thickening is attained when the cashew nut shell liquid and the previously oxidized siccative oil are present in the neighborhood of equal proportions, although for admixtures wherein the oxidized siccative oil constitutes from 10% to 50% by weight of the combined weight of the oxidized siccative oil and the cashew nut shell liquid the thickening reaction in all cases is greatly accelerated and this constitutes preferred practice of the present invention. As the proportion of the oxidized siccative oil is increased above 50% and up to 90% by weight of the combined weight of the oxidized siccative oil and the cashew nut shell liquid, then the rate at which the thickening reaction takes place falls off to some extent although the rate of the reaction in all cases is much greater than would otherwise be possible. This may be illustrated by admixtures containing 10%, 50% and 90% of oxidized linseed oil containing about 6% of added oxygen, the balance being cashew nut shell liquid. Upon heating these admixtures at about 240° F., the times required to obtain a given degree of gelation were 1⅓, ¾ and 4¾ hours respectively, as compared with 32½ hours for the cashew nut shell liquid by itself and 20½ hours for the oxidized siccative oil by itself. On the other hand, the proportion of the previously oxidized siccative oil may be reduced to less than 10% by weight of the combined weight of the oxidized siccative oil and the cashew nut shell liquid down to about 3% by weight of the admixture but in such case in order to obtain a pronounced acceleration of the thickening reaction the minimum amount of added oxygen contained in the oxidized siccative oil should vary proportionally from about 2% to about 4% as the proportion of the oxidized siccative oil is reduced from about 10% to about 3%.

As is evident from the foregoing, the polymerization of cashew nut shell liquid to produce a thickening thereof can be greatly accelerated by commingling the cashew nut shell liquid with a previously oxidized siccative oil. Moreover, the rate at which the reaction between the cashew nut shell liquid and the previously oxidized oil takes place can be controlled depending on the relative proportions of the cashew nut shell liquid and the oxidized oil, the amount of added oxygen contained in the oxidized oil and the temperature at which these materials are maintained during the reaction. These conditions can be adjusted so as to accomplish the amount of thickening that is desired at such rate as may be desired so as to afford a control which can be exercised in accordance with whatever is regarded as preferable for the purposes contemplated.

While specific reference has been made hereinabove to the employment of oxidized linseed oil, other siccative oils may be employed. Examples of drying oils other than linseed oil are soya bean, perilla, chia, hempseed, poppy seed, safflower, sunflower seed, walnut, dehydrated castor oils, fish oils and the like. Fish oils embrace oils such as menhaden, sardine, pilchard, etc. Examples of semi-drying oils are corn, cottonseed, peanut, sesame and the like. While the siccative oil that is employed may be a whole oil, the siccative oil may be an oil from which certain non-hardening or unoxidizable constituents have been removed, or may be an oil which has been modified by reaction with polybasic acids or anhydrides such as maleic acid or phthalic anhydride. More generally, the term "siccative oil" as used herein and in the claims refers to any whole or modified drying oil containing substantial non-conjugated unsaturation as evidenced by an iodine number in excess of about 90 and containing a substantial proportion of linoleic acid combined as a glyceride.

Cashew nut shell liquid which has been commingled with an oxidized siccative oil and subjected to thickening to desired consistency can be used for a variety of purposes. However, the practice of this invention is especially advantageous in the production of a thickened oleaginous material of gel-like consistency for use as a binder in the manufacture of compositions useful as the surface layer of flexible smooth surface coverings of the linoleum type. In such compositions the binder usually constitutes from about 20% to about 40% of the composition, the balance being fillers and pigments. The filler ordinarily includes a fibrous reenforcing filler such as wood flour, finely-subdivided cork, asbestos or the like; as well as pulverulent mineral fillers. The pulverulent mineral filler may include pigments such as iron oxide reds, yellows and blacks, ochre, lithopone, carbon blacks, titanium dioxide, chrome yellows, oranges and greens, phthallocyanine blue and organic lakes and toners; and diluents and extenders such as whiting, gypsum, slate flour, silica flour, clay, talc, calcium silicate, etc. In typical formulations of this type, the relative proportions of the ingredients are:

| | Percent |
|---|---|
| Binder | 25 to 40 |
| Fibrous filler | 25 to 45 |
| Pulverulent mineral filler | 15 to 50 |

The thickened oil composition which has been produced according to this invention from cashew nut shell liquid commingled with a previously oxidized siccative oil may be used to advantage in the manufacture of such linoleum compositions. In such an operation the commingled cashew nut shell liquid and oxidized siccative oil can be quickly brought to a gel consistency appropriate for working with the filler materials using known methods and equipment conventional in the linoleum industry. The composition so produced can then be applied to a suitable backing as by a calendering operation, the backing being any suitable material such as burlap, bitumen impregnated flooring felt, or other sheet material in the form of fabric, felt or the like. After the composition has been applied as a surfacing layer, the freshly prepared product may then be subjected to seasoning in the manner that is conventional in the linoleum industry so as to develop the hardness and toughness required in a product of this kind. The composition can likewise be used in the manufacture of tile-like bodies either with or without a strain-resisting backing of sheet material.

By way of affording a specific example of the practice of this invention 90 parts of treated cashew nut shell liquid were commingled with 10 parts of blown linseed oil of soft gel-like consistency and the commingled materials were cooked for twenty minutes in a Pfleiderer mixer at a temperature of about 225° F. with agitation, thereby producing a thickened oil of firm gel consistency. This thickened oil was used as the binder in the preparation of linoleum composition formulated essentially as follows:

| | Percent |
|---|---|
| Binder | 36.5 |
| Wood flour | 6.7 |
| Finely-divided cork | 36.6 |
| Pigment | 20.2 |

The composition had good calendering properties and was sheeted by calendering to form a layer 3.3 mm. in thickness, which is appropriate for a floor covering; and the sheeted material was seasoned by stoving at about 175° F. for 43 days. The composition material of the surface layer was then tested at 72° F. for its flexibility and stiffness, as well as for its initial penetration, residual penetration and resiliency when subjected to load. The product was also tested for its alkali resistance. The tests employed in making these determinations are the standard tests used in the linoleum floor covering industry and may be briefly identified or characterized as follows:

Initial penetration or indentation is determined by measuring the penetration resulting when a 200 lb. load is applied on a .282 inch diameter flat ended pin resting on the surface of the sample for one minute and is expressed as percent of the original thickness of the sample. This load is equivalent to 3200 lbs. per square inch.

Residual indentation is that portion of the initial indentation which does not recover in one minute after the removal of the load, and is expressed as percent of the original thickness.

Resiliency is the elastic recovery which occurs within one minute after removal of the load used in making the indentation test above, and is expressed as a percentage of the initial indentation.

Flexibility is expressed as the diameter in inches of the smallest mandrel over which a 2 inch wide sample can be bent 180° in about 5 seconds without cracking or breaking.

Stiffness is determined using a machine equipped with a constant speed, reversible motor which drives a bending mechanism to the right or left alternately, and is expressed in arbitrary units which represent the force required to bend the sample through a prescribed angle.

Alkali resistance is the depth measured in hundredths of a millimeter to which 2 cc. of a 5% aqueous solution of sodium hydroxide will etch in one hour acting on a confined circular area approximately ⅞" in diameter.

*Test conditions.*—All the above tests normally are performed at temperatures between 70° F. and 77° F. and at relative humidities between 50% and 70%.

The results of the above-mentioned tests are listed below:

| | |
|---|---|
| Flexibility | 1¾ |
| Stiffness | 460 |
| Alkali resistance | 2 |
| 200 lb. load: | |
|    Percent initial indentation | 22.4 |
|    Percent residual indentation | 3.0 |
|    Percent resilience | 86.6 |

The results of the foregoing tests show that the product produced and formulated as above described provided a surface layer for smooth surface coverings suitable for floors, walls, articles of furniture, etc., which exhibited very high resiliency and flexibility as well as a high degree of hardness. The resistance to alkalis above indicated is extremely high, for the depth of the etch is only about one-twentieth the depth of the etch that is produced by the alkali resistance test when conventional linoleum cement is employed in a similar formulation. The composition material above described also exhibited greater resistance to chemicals and solvents, as well as greater resistance to high temperature and humidity in comparison with similarly formulated linoleum compositions employing conventional oxidized oil-resin linoleum cement as the binder.

The properties that have been mentioned hereinabove in connection with a specific example, are typical of the properties that are obtainable notwithstanding wide variations in the relative proportions of cashew nut shell liquid and previously oxidized siccative oil used in the preparation of the binder. The property that one might expect to vary most greatly is the property of alkali resistance, for as the proportion of the oxidized oil is increased one might expect the alkali resistance to fall off rapidly. However, such is not the case. Thus, when the proportion of oxidized oil was increased to 50% of the oxidized oil-cashew nut shell liquid reaction product, the alkali resistance was such that the depth of the etch was somewhat less than when only 10% of the oxidized oil was employed. Even when the proportion of the oxidized siccative oil was increased to 90%, the depth of the etch was only one-quarter to one-fifth that which is produced under the alkali resistance test when the binder used is conventional linoleum cement.

While the product of reaction between a cashew nut shell liquid and a previously oxidized siccative oil can be used alone as a binder or otherwise, the product may be commingled either before, during, or after the reaction has taken place with other materials such as resins, plasticizers, conventional linoleum cement, or the like. However, in order to obtain in pronounced degree the advantageous properties of the product of the interaction between cashew nut shell liquid and an oxidized siccative oil, such product should constitute at least a major proportion of the binder material.

While the thickened reaction product produced according to this invention has been described particularly in connection with the production of a binder appropriate for combination with filler materials to afford compositions suitable for the surface layer of smooth surface floor coverings and the like, it may also be used for other purposes. Thus, the mixed material while still possessing fluidity can be used to impregnate bibulous materials or as a coating, and advantage can be taken of the rapid thickening and gel formation that results because of the reaction which occurs between the cashew nut shell liquid and the previously oxidized oil.

In connection with the foregoing description of specific compositions and formulations, the stated percentages, proportions or parts of the different constituents refer to percentages, proportions or parts by weight.

It is apparent from the foregoing that the production of a thickened oleaginous material utilizing cashew nut shell liquid is greatly improved according to this invention by reason of the peculiar and special interaction that takes place between cashew nut shell liquid and a previously oxidized siccative oil. The action that takes place is controllable as to the extent of the thickening that is accomplished and as to the rate at which the thickening takes place, and it is of great advantage commercially that the time required to accomplish a given amount of thickening can be very greatly reduced as compared with either cashew nut shell liquid by itself or with an oxidized siccative oil by itself. Moreover, it is highly significant and important that the material employed to promote the thickening action of the cashew nut shell liquid is one which is inexpensive and which does not possess undesirable properties, e. g., excessive toxicity. It is also important that the thickened reaction product possesses the highly desirable and unusual properties and characteristics that have been mentioned hereinabove.

While this invention has been described in connection with certain examples of the practice thereof, it is to be understood that this has been done by way of illustration and in order to afford a better understanding of this invention, and that the scope of this invention is to be governed by the language of the following claims.

We claim:

1. A process comprising commingling cashew nut shell liquid and a previously oxidized siccative oil to form an admixture wherein said previously oxidized oil constitutes from about 3% to about 90% by weight of the combined weight of said oxidized siccative oil and said cashew nut shell liquid, the amount of added oxygen contained in said previously oxidized siccative oil being from about 4% to about 9% by weight, and subjecting said admixture to heat maintained at a temperature below about 300° F. thereby effecting a substantial thickening thereof produced substantially entirely by interaction between said cashew nut shell liquid and said previously oxidized siccative oil.

2. A process according to claim 1 wherein said previously oxidized siccative oil constitutes from about 10% to about 50% by weight of the combined weight of said oxidized siccative oil and said cashew nut shell liquid.

3. A process which comprises commingling cashew nut shell liquid with a previously oxidized siccative oil containing between 4% and 16.5% by weight of added oxygen to form an admixture wherein said oxidized siccative oil constitutes from about 10% to about 90% by weight of the combined weight of said cashew nut shell liquid and said oxidized siccative oil and subjecting the admixture to heat at a temperature of about 175° F. to about 300° F. until the admixture is thickened to gel consistency by interaction between said cashew nut shell liquid and said previously oxidized siccative oil as the only material to promote the thickening of said cashew nut shell liquid.

4. A process according to claim 3 wherein said oxidized siccative oil constitutes not substantially over 50% by weight of the combined weight of said cashew nut shell liquid and said oxidized siccative oil.

5. A process according to claim 3 wherein said oxidized siccative oil contains from about 4% to about 9% by weight of added oxygen.

6. A process according to claim 3 wherein said siccative oil consists essentially of linseed oil.

7. A process according to claim 3 wherein said siccative oil consists essentially of soya bean oil.

8. A process according to claim 3 wherein said siccative oil consists essentially of perilla oil.

9. A process which comprises subjecting siccative oil to oxidation until the added oxygen amounts to about 4% to about 9% by weight, then dissolving the oxidized siccative oil in cashew nut shell liquid in an amount constituting from about 10% to about 50% by weight of the combined weight of the oxidized siccative oil and the cashew nut shell liquid, subjecting the mixture to agitation and to heat maintained at a temperature not substantially above 300° F. until the mixture is thickened to gel consistency, essentially by the interaction of said cashew nut shell liquid with said previously oxidized siccative oil.

10. The gelled product of interaction between commingled cashew nut shell liquid and a previously oxidized siccative oil produced according to the process of claim 14.

11. The gelled product of interaction between commingled cashew nut shell liquid and previously oxidized siccative oil which constitutes from about 3% to about 50% by weight of the combined weight of said cashew nut shell liquid and said previously oxidized siccative oil, said product being that produced according to the process of claim 1.

12. A process comprising commingling cashew nut shell liquid and a previously oxidized siccative oil containing from 4% to 16.5% by weight of added oxygen to form an admixture thereof wherein said previously oxidized siccative oil constitutes from 3% to 90% by weight of the combined weight of said oxidized siccative oil and said cashew nut shell liquid, and the interaction of said cashew nut shell liquid and said previously oxidized siccative oil in said admixture at a temperature not above about 300° F. until a substantial thickening thereof is obtained by said interaction, said thickening resulting essentially solely from the interaction of said cashew nut shell liquid and said previously oxidized oil and the influence of said temperature maintained not above 300° F. and any prevailing oxidizing conditions.

13. A process according to claim 12 wherein said interaction between said cashew nut shell liquid and said previously oxidized siccative oil is carried out essentially in the absence of any material other than a material selected from the group consisting of binder materials and plasticizer materials.

14. A process according to claim 12 wherein said admixture is thickened to gel consistency.

LEON B. PALMER.
RALPH W. CHARLTON.

REFERENCES CITED

The following references are of record in the file of this patent:

UNITED STATES PATENTS

| Number | Name | Date |
| --- | --- | --- |
| 414,722 | Robinson | Nov. 12, 1889 |
| 1,725,797 | Harvey | Aug. 27, 1929 |
| 2,323,118 | Caplan | June 29, 1943 |
| 2,476,879 | Kronstein | July 19, 1949 |